L. Bishop,
Fruit Strainer,
No. 2,281. Reissued June 12, 1866.
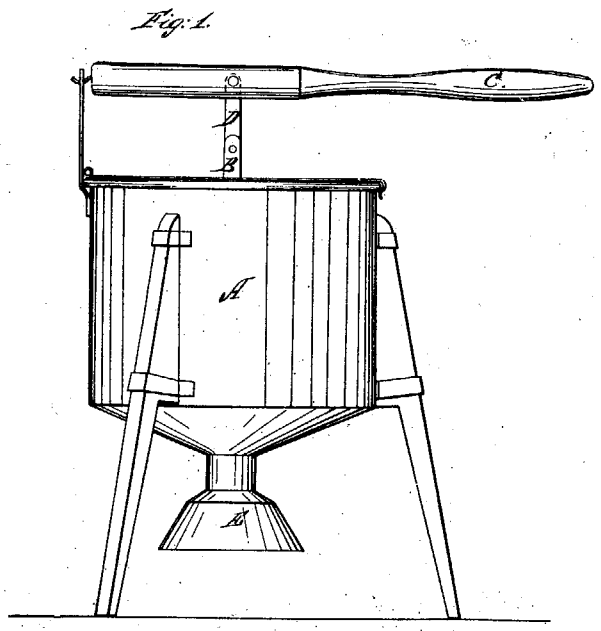
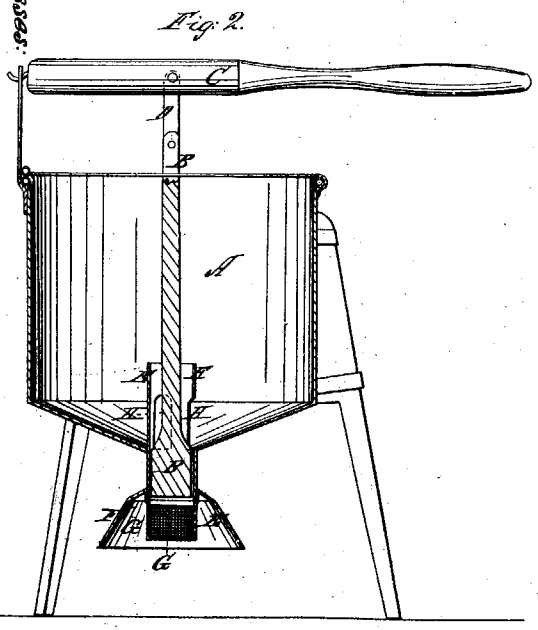
Witnesses:
Wm C. Kittons
Irim Swain
Inventor:
Luman Bishop
N. PETERS, PHOTO-LITHOGRAPHER, WASHINGTON, D. C.

UNITED STATES PATENT OFFICE.

LUMAN BISHOP AND STEPHEN BREWER, CORTLANDVILLE, NEW YORK, ASSIGNEES OF LUMAN BISHOP.

IMPROVED APPARATUS FOR STRAINING PAINTS AND OTHER MATERIALS.

Specification forming part of Letters Patent No. 52,661, dated February 20, 1866; Reissue No. 2,281, dated June 12, 1866.

*To all whom it may concern:*

Be it known that I, LUMAN BISHOP, of Cortlandville, in the county of Cortland and State of New York, have invented a new and useful Press Strainer and Refiner for Straining and Refining Paint, Paste, Cream, and various other substances; and I do hereby declare that the following is an accurate description of the construction and operation of the same, reference being had to the accompanying drawings, making a part of this specification.

Figure No. 1 in the plate of drawings represents the machine as it appears in working order, A representing the reservoir; B, the follower or piston, which, enlarged at its lower end to fit the tube and strainer, follows and presses the substance to be strained or refined down into and through the strainer. C represents the lever by which the power is applied; D, the joint in the follower whereby a directly perpendicular motion thereof is obtained; E, a guard around the strainer, to prevent the paint or other substance being strained or refined from spurting out laterally onto or beyond the sides of the vessel placed underneath to receive the strained substance.

Fig. 2 represents the machine bisected, showing those parts which cannot be seen in Fig. 1. F represents the tube through which the liquid passes from the reservoir down into the strainer, the upper portion of which tube serves as guide for the follower or piston when raised to admit the liquid into the tube. G represents the strainer attached to the lower end of said tube. H H H represent large lateral openings or apertures in the tube for the admission of the liquid from the reservoir thereinto, and so down into the strainer.

The mode of constructing and using my invention is as follows: It consists of a reservoir for containing the substance to be strained or refined, usually made of tin and about the size and shape of an ordinary water-pail, except that the bottom thereof is beveling so as to cause the contents to gravitate toward the center, at which place a tube, F, of any convenient size, comes up through, forming the outlet to the reservoir and the inlet to the strainer. This tube extends down to or below the bottom of the reservoir, and to it the strainer G is attached by screw or other suitable attachment or it may be permanently attached thereto by soldering. The attachment by screw or other similar means is useful, inasmuch as then the strainer can be readily detached for the purpose of cleaning, and also that a fine or coarse one may be used adapted to the substance to be strained or refined. Said strainer is made of perforated tin or other metal, or of wire-cloth. It is cylindrical in form and hollow and of any desired length and size. The lower or bottom end is closed, having no perforations therein, the perforations being all lateral. By having these perforations lateral instead of through the bottom, I am able, by simply making my strainer longer, to obtain as large a surface or area of perforations as may be desirable in any case for the rapid transmission of the substance to be strained or refined. Another important advantage also thus gained is that the inside surface of the strainer is cleared of all obstructions and impurities at each passage of the follower or piston. These obstructions and impurities, often so coarse and hard that it is neither possible nor desirable to force them through, naturally pass down into the bottom of the strainer, where they remain until removed.

In relation to the form of this strainer, it is obvious that, instead of being cylindrical, it may be rectangular, octagonal, or of any other form between the rectangular and the cylindrical, or with convexed sides, or of an irregular form, and, with a closely-fitting piston or follower, accomplish substantially the same results as the cylindrical form. These several forms would, however, be simply equivalents of the one herein particularly set forth. I do not therefore design to confine myself to any specific form, but use any of the equivalents above mentioned.

The tube before mentioned passes up through the bottom of the reservoir several inches and has several large apertures, H H H, therein, through which the contents of the reservoir passes down into the lower portion of said tube and so into the strainer. This upper portion of the tube also serves as a guide for the lower end of the follower or piston as it rises to admit the liquid into the tube.

It is obvious that, instead of the continuation of the tube up into the reservoir, three or four or more upright wires may be arranged as a guide for the piston, the spaces between which serving to admit the liquid freely down into the tube below; or narrow strips of tin or other metal may be set up or arranged to accomplish the same purpose, which methods would, however, be simply equivalents of the one herein particularly described.

I have a follower or piston, B, the lower end of which closely fits the tube and strainer, and which, worked by a lever, C, presses the liquid down into and through the strainer. I make a joint, D, in the follower, by which I obtain a perpendicular motion thereof. Around the strainer, and at a little distance therefrom, I have a guard, E, to prevent the liquid from spurting out into or beyond the sides of the vessel placed underneath to receive the same.

The mode of operating my machine is as follows: The substance to be strained or refined is poured into the reservoir. The piston or follower is then raised by means of the lever attached thereto high enough to allow the liquid to pass down through the large lateral apertures in the upper portion of the tube, and fill the tube and strainer. Then, by forcing down the follower or piston, the liquid in the tube and strainer is pressed through the perforations of the strainer. This operation is continued until the contents of the reservoir is all pressed through.

What I claim as my invention, and desire to secure by Letters Patent, is—

1. The strainer G or its equivalent, as and for the purposes herein shown and described.

2. The combination of the strainer G with the tube F and piston B, substantially as and for the purposes described.

3. The lateral apertures H H H, or their equivalent, in combination with the tube and piston, substantially as and for the purpose herein described.

LUMAN BISHOP.

Witnesses:
WM. W. WINTER,
D. C. MCGRAW.